(12) United States Patent
Doutre et al.

(10) Patent No.: US 11,804,212 B2
(45) Date of Patent: Oct. 31, 2023

(54) STREAMING AUTOMATIC SPEECH RECOGNITION WITH NON-STREAMING MODEL DISTILLATION

(71) Applicant: Google LLC, Mountain View, CA (US)

(72) Inventors: Thibault Doutre, Mountain View, CA (US); Wei Han, Mountain View, CA (US); Min Ma, Mountain View, CA (US); Zhiyun Lu, Mountain View, CA (US); Chung-Cheng Chiu, Sunnyvale, CA (US); Ruoming Pang, New York, NY (US); Arun Narayanan, Santa Clara, CA (US); Ananya Misra, Mountain View, CA (US); Yu Zhang, Mountain View, CA (US); Liangliang Cao, Mountain View, CA (US)

(73) Assignee: Google LLC, Mountain View, CA (US)

( * ) Notice: Subject to any disclaimer, the term of this patent is extended or adjusted under 35 U.S.C. 154(b) by 135 days.

(21) Appl. No.: 17/348,118

(22) Filed: Jun. 15, 2021

(65) Prior Publication Data

US 2022/0343894 A1    Oct. 27, 2022

Related U.S. Application Data

(60) Provisional application No. 63/179,084, filed on Apr. 23, 2021.

(51) Int. Cl.
*G10L 15/06*    (2013.01)
*G10L 15/08*    (2006.01)
(Continued)

(52) U.S. Cl.
CPC ............ *G10L 15/063* (2013.01); *G06N 3/045* (2023.01); *G10L 15/083* (2013.01); *G10L 15/18* (2013.01)

(58) Field of Classification Search
None
See application file for complete search history.

(56) References Cited

U.S. PATENT DOCUMENTS

2021/0043186 A1 * 2/2021 Nagano ................... G10L 15/18
2021/0065680 A1 * 3/2021 Audhkhasi ............. G06N 3/084
(Continued)

FOREIGN PATENT DOCUMENTS

CN         111402891 A  *  7/2020

OTHER PUBLICATIONS

Yevgen Chebotar, Austin Waters; Distilling knowledge from ensembles of neural networks for speech recognition; Sep. 2016 URL: https://www.isca-speech.org/archive_v0/Interspeech_2016/pdfs/1190.PDF (Year: 2016).*

(Continued)

*Primary Examiner* — Richa Mishra
(74) *Attorney, Agent, or Firm* — Honigman LLP; Brett A. Krueger; Grant J. Griffith

(57) ABSTRACT

A method for training a streaming automatic speech recognition student model includes receiving a plurality of unlabeled student training utterances. The method also includes, for each unlabeled student training utterance, generating a transcription corresponding to the respective unlabeled student training utterance using a plurality of non-streaming automated speech recognition (ASR) teacher models. The method further includes distilling a streaming ASR student model from the plurality of non-streaming ASR teacher models by training the streaming ASR student model using the plurality of unlabeled student training utterances paired with the corresponding transcriptions generated by the plurality of non-streaming ASR teacher models.

16 Claims, 8 Drawing Sheets

(51) Int. Cl.
    *G10L 15/18*     (2013.01)
    *G06N 3/04*      (2023.01)
    *G06N 3/045*     (2023.01)

(56)             References Cited

U.S. PATENT DOCUMENTS

2021/0082399 A1* 3/2021 Kurata .................. G10L 15/34
2022/0208179 A1* 6/2022 Kurata .................. G06N 3/045

OTHER PUBLICATIONS

Jun. 22, 2022 Written Opinion (WO) of the International Searching Authority (ISA) and International Search Report (ISR) issued in International Application No. PCT/US2022/025649.
Thibault Doutre et al: "Improving Streaming Automatic Speech Recognition With Non-Streaming Model Distillation On Unsupervised Data", arxiv.org, Cornell University Library, 201 Olin Library Cornell University Ithaca, NY 14853, Oct. 23, 2020 (Oct. 23, 2020).
Chebotar Yevgen et al: "Distilling Knowledge from Ensembles of Neural Networks for Speech Recognition", INTERSPEECH 2016, Sep. 8, 2016 (Sep. 8, 2016), pp. 3439-3443.
Thibault Doutre et al: "Bridging the gap between streaming and non-streaming ASR systems bydistilling ensembles of CTC and RNN-T models", arxiv.org, Cornell University Library, 201 Olin Library Cornell University Ithaca, NY 14853, Apr. 25, 2021 (Apr. 25, 2021).

* cited by examiner

STREAMING AUTOMATIC SPEECH RECOGNITION WITH NON-STREAMING MODEL DISTILLATION

CROSS REFERENCE TO RELATED APPLICATIONS

This U.S. patent application claims priority under 35 U.S.C. § 119(e) to U.S. Provisional Application 63/179,084, filed on Apr. 23, 2021. The disclosure of this prior application is considered part of the disclosure of this application and is hereby incorporated by reference in its entirety.

TECHNICAL FIELD

This disclosure relates to improving streaming automatic speech recognition (ASR) with non-streaming model distillation.

BACKGROUND

Speech recognition systems are used to transcribe speech to text in many daily applications today. These speech recognition systems may be embedded on user devices such as smart home devices or smartphones, or used in cloud-related services. Typically, speech recognition systems are designed to be either streaming or non-streaming systems. Non-streaming speech recognition systems are afforded the opportunity to take advantage of the full sequence of audio when transcribing speech, but to account for the full sequence of audio, a non-streaming speech recognition system requires the receipt of the entire speech sequence prior to transcript generation. In contrast, streaming speech recognition systems have been developed for real-time speech recognition tasks, such as user assistants and real-time captioning. Yet due to their streaming constraints, these streaming speech recognition systems cannot utilize the full context of audio sequence and tend to perform poorer than their non-streaming counterparts. Due to the performance disparity between streaming and non-streaming speech recognition systems, there is a need to improve the performance of streaming speech recognition systems.

SUMMARY

One aspect of the disclosure provides a computer-implemented method for training a streaming automatic speech recognition student model. The method, when executed by data processing hardware causes the data processing hardware to perform operations. The operations include receiving a plurality of unlabeled student training utterances. The operations also include, for each unlabeled student training utterance, generating a transcription corresponding to the respective unlabeled student training utterance using a plurality of non-streaming automated speech recognition (ASR) teacher models. The operations further include distilling a streaming ASR student model from the plurality of non-streaming ASR teacher models by training the streaming ASR student model using the plurality of unlabeled student training utterances paired with the corresponding transcriptions generated by the plurality of non-streaming ASR teacher models.

Another aspect of the disclosure provides a system for training a streaming automatic speech recognition student model. The system includes data processing hardware and memory hardware in communication with data processing hardware. The memory hardware stores instructions that when executed on the data processing hardware causes the data processing hardware to perform operations. The operations include receiving a plurality of unlabeled student training utterances. The operations also include, for each unlabeled student training utterance, generating a transcription corresponding to the respective unlabeled student training utterance using a plurality of non-streaming automated speech recognition (ASR) teacher models. The operations further include distilling a streaming ASR student model from the plurality of non-streaming ASR teacher models by training the streaming ASR student model using the plurality of unlabeled student training utterances paired with the corresponding transcriptions generated by the plurality of non-streaming ASR teacher models.

Implementations of the computer-implemented method or the system of the disclosure may include one or more of the following optional features. In some implementations, generating the transcription corresponding to the respective unlabeled student training utterance includes receiving, as input at the plurality of non-streaming ASR teacher models, the respective unlabeled student training utterance, predicting, at each non-streaming ASR teacher model, an initial transcription for the respective unlabeled student training utterance, and generating the transcription for the respective unlabeled student training utterance to be output by the plurality of non-streaming ASR teacher models based on the initial transcriptions of each non-streaming ASR teacher model predicted for the respective unlabeled student training utterance. In these implementations, generating the transcription for the respective unlabeled student training utterance to be output by the plurality of non-streaming ASR teacher models based on the initial transcriptions of each non-streaming ASR teacher model predicted for the respective unlabeled student training utterance includes constructing the transcription using output voting. Constructing the transcription using output voting includes aligning the initial transcriptions from each non-streaming ASR teacher model to define a sequence of frames, dividing each initial transcription into transcription segments, each transcription segment corresponding to a respective frame, selecting, for each respective frame, a most repeated transcription segment across all initial transcriptions, and concatenating the most repeated transcription segment of each respective frame to form the transcription.

In these implementations of either the method or the system, the streaming ASR student model may include a recurrent neural network transducer (RNN-T) architecture. The streaming ASR student model may include a conformer-based encoder. Each non-streaming ASR teacher model may include a connectionist temporal classification (CTC) architecture. Here, the CTC architecture includes a language model configured to capture contextual information for a respective utterance. Each non-streaming ASR teacher model may include a conformer-based encoder. In some examples, the plurality of non-streaming ASR teacher models includes at least two different recurrent neural network architectures. In these examples, a first non-streaming ASR teacher model includes a recurrent neural network architecture and a second non-streaming ASR teacher model includes a connectionist temporal classification (CTC) architecture.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
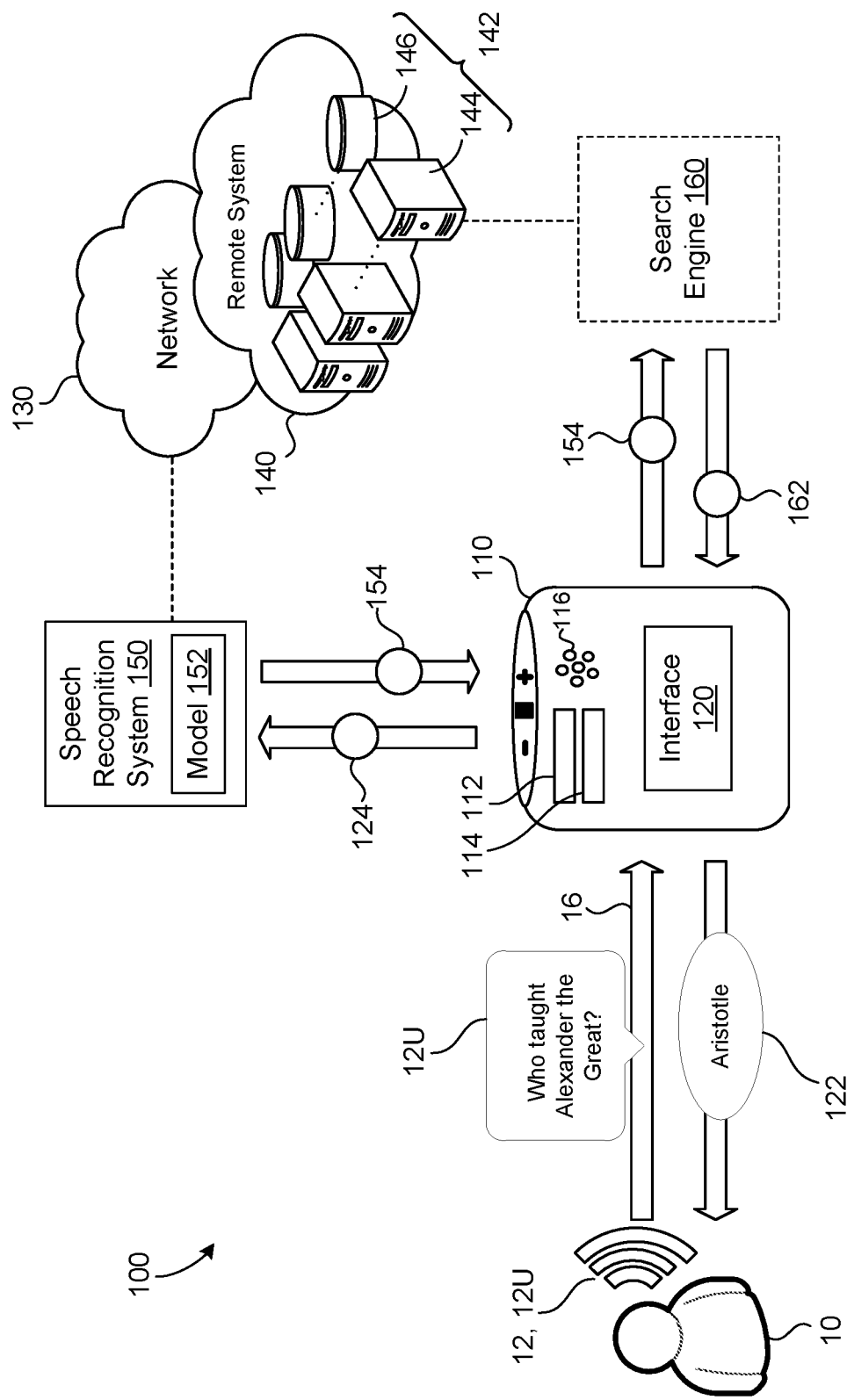
FIG. 1 is a schematic view of an example speech environment using a streaming automatic speech recognition (ASR) student model.

Automatic speech recognition (ASR) systems continue to constantly develop to support the demands of speech-enabled devices. As speech-enabled devices incorporate ASR systems for various functionality including on-device applications, the ASR systems are relied on to meet on-device expectations. These on-device expectations include speech transcription with minimal latency to facilitate human-computer interactions that do not negatively affect a user experience. With the desire for minimal latency, these user devices or speech-enabled devices are generally unable to leverage a remote ASR system (e.g., an ASR system located on a remote computing system) since the remote communication would inherently introduce some degree of latency. In addition to demanding minimal latency, speech-enabled devices are often constrained with respect to the amount of resources that are available locally on the device. For these reasons, ASR systems have evolved to use end-to-end streaming models for on-device speech recognition tasks.

A streaming ASR model refers to a speech recognition model deployed in an ASR system that may be used to transcribe speech in real-time (or near real-time). To perform transcription in real-time, a streaming ASR model produces and updates transcription results (i.e., hypotheses or predictions) on a frame-by-frame basis. With a frame-by-frame transcription approach, a streaming ASR model accounts for little to no future context for a given speech input. That is, if the streaming ASR model receives two sentences of speech as input, the streaming ASR model cannot utilize the full context of the input, the two sentences, to produce its transcription, but rather produces transcription results as the streaming ASR model receives pieces of the two sentences (e.g., frames of word pieces). In contrast, a non-streaming ASR model leverages the full context of a given speech input to produce its transcription results. Therefore, if a non-streaming ASR model receives two sentences of speech as input, it would consider the entirety of the two sentences in order to produce its transcription. One reason on-device speech recognition tasks have come to use streaming ASR models is that non-streaming ASR models may be rather large models in order have the proper memory to consider the entirety of the speech input to produce transcription results. For this reason, non-streaming ASR models are often deployed remotely rather than on-device because these non-streaming ASR models may be resource intensive. Therefore, streaming ASR models may offer a more compact memory footprint when compared to non-streaming ASR models which makes streaming ASR models typically more suitable to be used on-device.

Unfortunately, as streaming ASR models are becoming increasingly common on-device, streaming ASR models are not without their setbacks. For example, by operating on a frame-by-frame basis, the streaming ASR model is not afforded the contextual benefits of a non-streaming ASR model. In other words, when a model is constrained in terms of the context that it may utilize to generate its transcription results, the overall accuracy of the transcription may suffer. Yet often, a user of the speech recognition device may prefer the speech recognition system (i.e., the ASR system) to occur in real-time, or a streaming manner, even though the results may not always be the most accurate. This tradeoff has been widely accepted, but also leaves room for improvement with respect to transcription accuracy, especially given the fact that ASR models, such as non-streaming ASR models, exist and tend to have better transcription performance than their streaming model counterparts.

To address the transcription performance for streaming ASR models, implementations described herein are directed toward leveraging a non-streaming ASR model as a teacher to generate transcripts for a streaming ASR student model. The transcripts generated by the non-streaming teacher model may then be used to distill knowledge into the streaming ASR model. In this respect, the non-streaming ASR model functions as a teacher model while the streaming ASR model that is being taught by the distillation process is a student model. With this distillation approach to training a streaming ASR model, the streaming ASR student model learns to generate a transcript for a given speech input that is imbued with some of the increased transcription accuracy of the non-streaming ASR teacher model. That is, since full-context ASR models (i.e., non-streaming ASR models) perform better than streaming ASR models, a non-streaming ASR model may function as a strong teacher that fosters a more robust streaming ASR student model. For example, experiments have shown that the word error rate (i.e., a common speech recognition performance metric) for the streaming ASR student model is reduced when compared to a streaming ASR model taught by conventional means. Moreover, this approach is relatively efficient in that, by generating transcripts with the non-streaming ASR teacher model that will be used directly for training the streaming ASR student model, the approach avoids additional distillation pre-training to correct issues such as alignment mismatch.

The distillation approach also has some benefits that translate to ASR models for different languages (e.g., a French streaming ASR model or a Spanish streaming ASR model). One common issue is that a particular language may have data scarcity. Meaning that, there does not currently exist a corpus of adequate training data for that particular language. This may occur for several reasons, but one such reason is that audio samples used to train ASR models generally need to be paired with a corresponding label or transcription of the audio sample. Unfortunately, in some languages that suffer from audio sample scarcity, it is even less common for their audio samples to have a corresponding label. This fact alone makes training a streaming ASR model difficult not only because labels inform the training process whether a model is reaching a particular level of prediction accuracy, but also because end-to-end (E2E) models are notoriously data-hungry. Generally speaking, speech recognition models have evolved from multiple models where each model had a dedicated purpose to integrated models where a single neural network is used to directly map an audio waveform (i.e., input sequence) to an output sentence (i.e., output sequence). This integration has resulted in a sequence-to-sequence approach, which generates a sequence of words (or graphemes) when given a sequence of audio features. With an integrated structure, all components of a model may be trained jointly as a single E2E neural network. Here, an E2E model refers to a model whose architecture is constructed entirely of a neural network. A fully neural network functions without external and/or manually designed components (e.g., finite state transducers, a lexicon, or text normalization modules). Additionally, when training E2E models, these models generally do not require bootstrapping from decision trees or time alignments from a separate system, but often demand a large corpus of training data. Due to this demand, E2E streaming ASR models may not be feasible for particular languages. Yet with a teacher-student distillation approach, a streaming ASR student model may be trained in a particular language using unlabeled audio samples. For example, the non-streaming ASR teacher model, which is already trained to predict a label (i.e., generate a transcription for an given audio samples), generates labels for unlabeled audio samples so that the unlabeled audio samples may be paired with their corresponding labels generated by the non-streaming ASR teacher model to form a training data set for the streaming ASR student model. This therefore allows a streaming ASR student model to be distilled from unlabeled audio samples.

In some configurations, a streaming ASR student model learns from distilling knowledge from multiple teacher models. That is, the transcriptions from multiple non-streaming ASR teacher models may be combined to form a final transcription which will then be used in the distillation process to train the streaming ASR student model. In this approach, the final transcription functions to reduce errors that may occur in any single teacher model. In some implementations, when the streaming ASR model learns from multiple teacher models, the teacher models include different types of neural networks to diversely contribute to the final transcription. For instance, the teacher models may include Connectionist Temporal Classification (CTC) models, recurrent neural network-transducer (RNN-T) models, conformer models, etc., or any combination thereof. With a diverse ensemble of teacher models, the final transcription can be more accurate than any single model (e.g., due to inherent limitations of any particular model type).

Referring to FIG. 1, in some implementations, a speech environment 100 includes a user 10 providing a user interaction 12 to interact with a voice-enabled device 110 (also referred to as a device 110 or a user device 110). Here, the user interaction 12 is a spoken utterance 12, 12U corresponding to a query or a command to solicit a response from the device 110 or to have the device 110 execute a task specified by the query. In this sense, the user 10 may have conversation interactions with the voice-enabled device 110 to perform computing activities or find answers to questions.

The device 110 is configured to capture user interactions 12, such as speech, from one or more users 10 within the speech environment 100. An utterance 12U spoken by the user 10 may be captured by the device 110 and may correspond to a query or a command for a digital assistant interface 120 executing on the device 110 to perform an operation/task. The device 110 may correspond to any computing device associated with the user 10 and capable of receiving audio signals. Some examples of user devices 110 include, but are not limited to, mobile devices (e.g., mobile phones, tablets, laptops, e-book readers, etc.), computers, wearable devices (e.g., smart watches), music player, casting devices, smart appliances (e.g., smart televisions) and internet of things (IoT) devices, remote controls, smart speakers, etc. The device 110 includes data processing hardware 112 and memory hardware 114 in communication with the data processing hardware 112 and storing instructions, that when executed by the data processing hardware 112, cause the data processing hardware 112 to perform one or more operations related to speech processing.

The device 110 further includes an audio subsystem with an audio capturing device (e.g., an array of one or more microphones) 116 for capturing and converting audio data within the speech environment 100 into electrical signals. While the device 110 implements the audio capturing device 116 (also referred to generally as a microphone 116) in the example shown, the audio capturing device 116 may not physically reside on the device 110, but be in communication with the audio subsystem (e.g., peripherals of the device 110). For example, the device 110 may correspond to a vehicle infotainment system that leverages an array of microphones positioned throughout the vehicle.

A speech-enabled interface (e.g., a digital assistant interface) 120 may field the query or the command conveyed in the spoken utterance 12U captured by the device 110. The speech-enabled interface 120 (also referred to as interface 120 or an assistant interface 120) generally facilitates receiving audio data 124 corresponding to an utterance 12U and coordinating speech processing on the audio data 124 or other activities stemming from the utterance 12U to generate a response 122. The interface 120 may execute on the data processing hardware 112 of the device 110. The interface 120 may channel audio data 124 that includes an utterance 12U to various systems related to speech processing. For instance, FIG. 1 illustrates that the interface 120 communicates with a speech recognition system 150 (e.g., an automatic speech recognition (ASR) system). Here, the interface 120 receives audio data 124 corresponding to an utterance 12U and provides the audio data 124 to the speech recognition system 150. In some configurations, the interface 120 serves as an open communication channel between the microphone 116 of the device 110 and the speech recognition system 150. In other words, the microphone 116 captures an utterance 12U in an audio stream 16 and the interface 120 communicates audio data 124 corresponding to the utterance 12U converted from the audio stream 16 to the speech recognition system 150 for processing. More specifically, the speech recognition system 150 includes a speech recognition model 152 that processes the audio data 124 to generate a transcription 154 for the utterance 12U and may perform semantic interpretation on the transcription 154 to identify an appropriate action to perform. The interface 120 used to interact with the user 10 at the device 110 may be any type of program or application configured to execute the functionality of the interface 120. For example, the interface 120 is an application programming interface (API) that interfaces with other programs hosted on the device 110 or in communication with the device 110.

Referring specifically to the example of FIG. 1, an utterance 12U by the user 10 states, "Who taught Alexander the Great?" Here, receipt of the utterance 12U by the interface 120 causes the interface 120 to relay captured audio data corresponding to the query "who taught Alexander the Great?" to the speech recognition system 150 for processing. In some examples, the utterance 12U may include a hotword as a preceding invocation phrase that triggers the device 110 to wake-up (from a sleep or hibernation state) and initiates speech recognition on the hotword and/or one or more terms following the hotword. For example, detection of the hotword by a hotword detection system (e.g., a neural network-based model configured to detect acoustic features indicative of the hotword without performing speech recognition or semantic analysis) triggers the interface 120 to open the microphone 116 and relay subsequently captured audio data corresponding to the query "who taught Alexander the Great?" to the speech recognition system 150 for processing.

In response to receiving an utterance 12U in the audio stream 16, the interface 120 relays the audio data 124 corresponding to this utterance 12U to the speech recognition system 150 and the speech recognition system 150 performs speech recognition on the audio data 124 to generate a speech recognition result (e.g., transcription) 154 for the utterance 12U. The speech recognition system 150 and/or the interface 120 performs semantic interpretation on the speech recognition result 154 to determine that the utterance 12U corresponds to a search query for the identity of the person who educated Alexander the Great. Here, the interface 120 may submit the transcription 154 to a search engine 160 that searches for, and returns a search result 162 of "Aristotle" for the query of "Who taught Alexander the Great?" The interface 120 receives this search result 162 of "Aristotle" from the search engine 160 and, in turn, communicates "Aristotle" to the user 10 as a response 122 to the query of the utterance 12U. In some examples, the response 122 includes synthesized speech audibly output from the device 110.

In some implementations, the device 110 communicates via a network 130 with a remote system 140. The remote system 140 may include remote resources 142, such as remote data processing hardware 144 (e.g., remote servers or CPUs) and/or remote memory hardware 146 (e.g., remote databases or other storage hardware). The device 110 may utilize the remote resources 142 to perform various functionality related to speech processing. For instance, the search engine 160 may reside on the remote system 140. In one example, the speech recognition system 150 may reside on the device 110 for performing on-device automated speech recognition (ASR). Here, FIG. 1 depicts the search engine 160 in a dotted box to indicate that these components may reside on-device 110 or server-side (i.e., at the remote system 140).

Here, the ASR model 152 is a streaming ASR student model 152 that is deployed on-device rather than in the remote system 140. This means that the model 152 utilizes the local resources 112, 114 of the device 110 to perform speech recognition. FIG. 1 illustrates the speech recognition system 150 connected to the network 130 with a dotted line to indicate that speech recognition system 150 may leverage remote resources 142 of the remote system 140 in a particular circumstance. That is, prior to inference or deployment of the model 152 (i.e., prior to implementation), the streaming ASR model 152 learns how to generate speech recognition results (i.e., transcripts 154 or labels) from a non-streaming ASR model (e.g., shown as teacher model 210 in FIGS. 2A-3B) located in the remote system 140. In this sense, the model 152 receives distilled knowledge from a non-streaming ASR model that is able to be larger (i.e., utilize a greater amount of remote resources 142 when compared to the local resources 112, 114) and generally more accurate at speech recognition performance than conventional streaming ASR models.

The student model 152 may have different types of neural network architecture. In some examples, the student model 152 is an RNN-T model with an encoder-decoder architecture. When the student model 152 is an RNN-T model, the student model 152 may include an encoder network with multiple layers of unidirectional Long Short Term Memory (LSTM) cells (e.g., 8 layers of LSTMs with 2048 cells). Here, each LSTM may have a projection layer of, for example, 640 outputs. For this RNN-T model, the decoder of the student model 152 may be two unidirectional LSTMs (e.g., with 2048 units and 640 projections similar to the encoder). The encoder-decoder architecture of the RNN-T may also include a joint network. The joint network may be a fully connected layer with 640 units. In some configurations, the encoder of the student model 152 (e.g., when the student model 152 is a RNN-T model) uses a conformer encoder, but, as a streaming ASR model, any attention layers and/or convolutions are not fully contextual to ensure streaming capability.

Figure 2A:
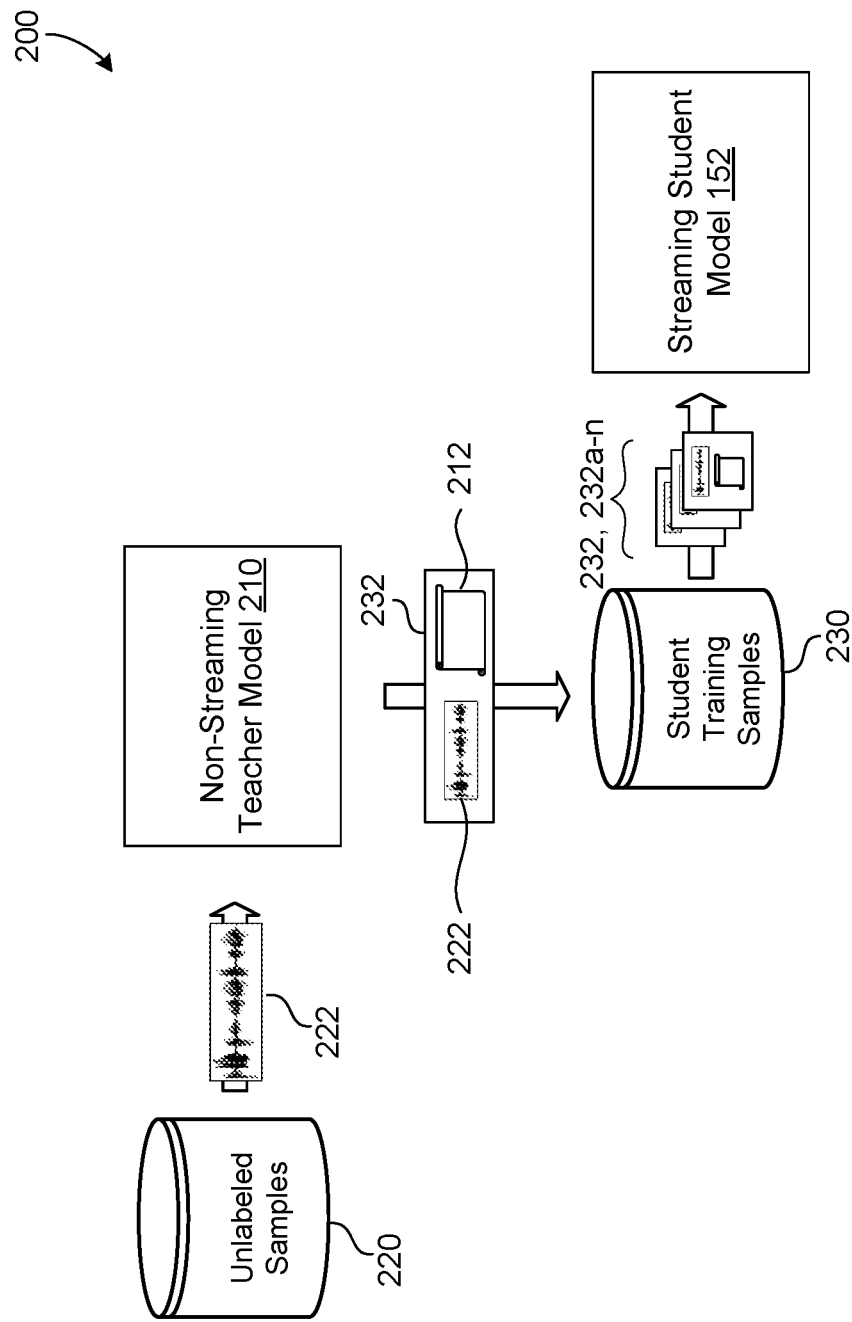
FIGS. 2A-2C are schematic views of example training processes for training the streaming ASR student model using a non-streaming ASR teacher model.
Figure 2B:
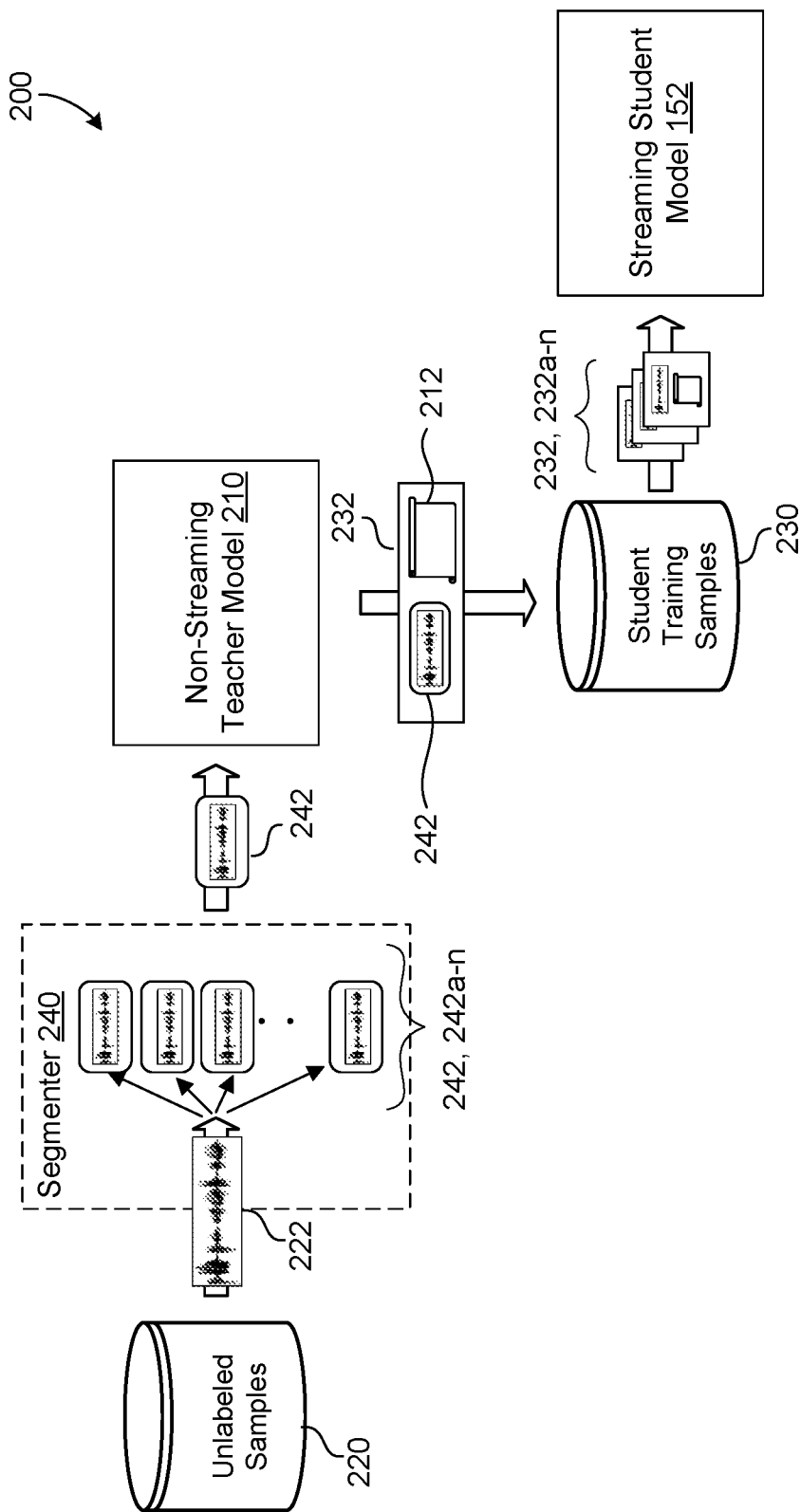
Figure 2C:
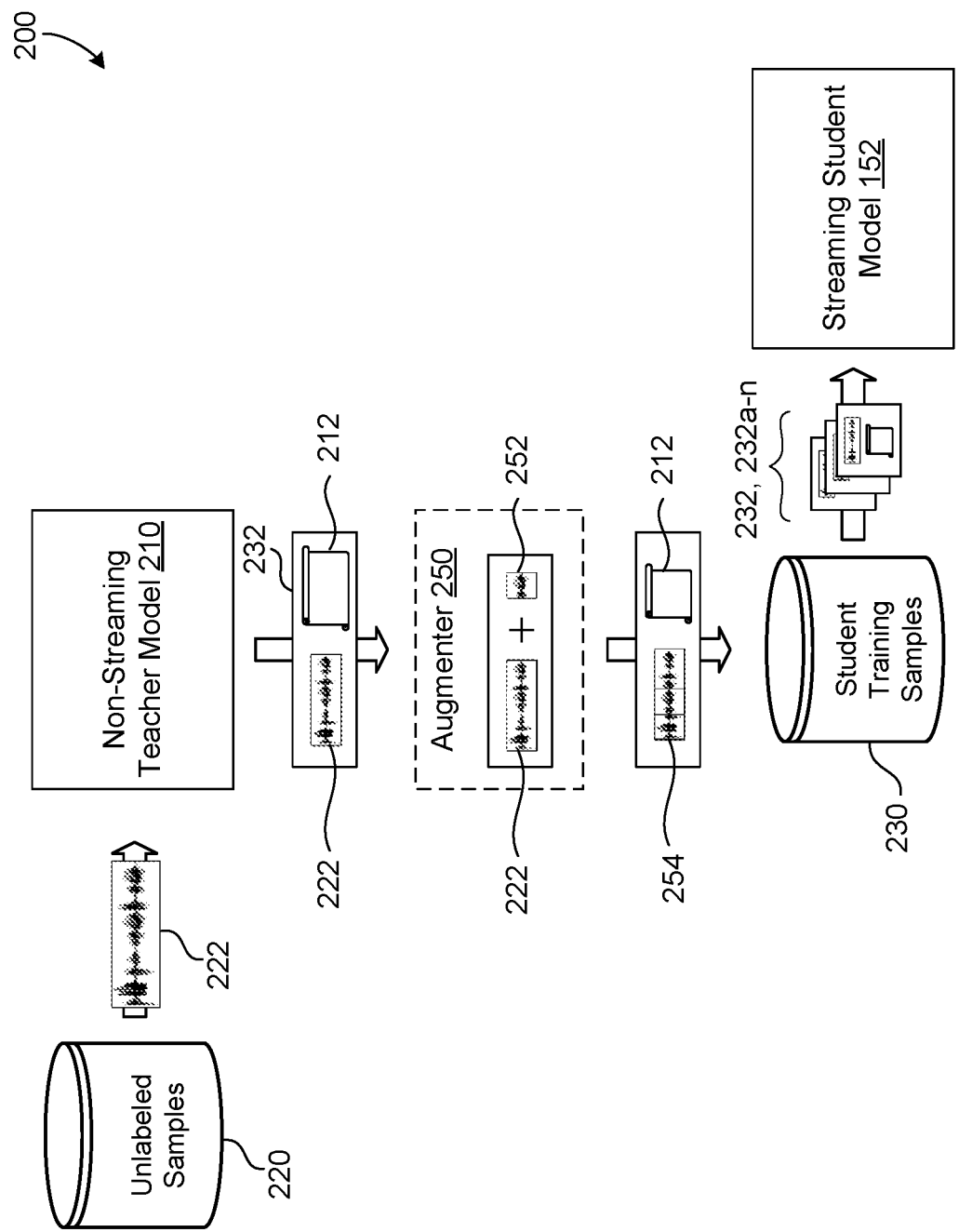
Figure 3A:
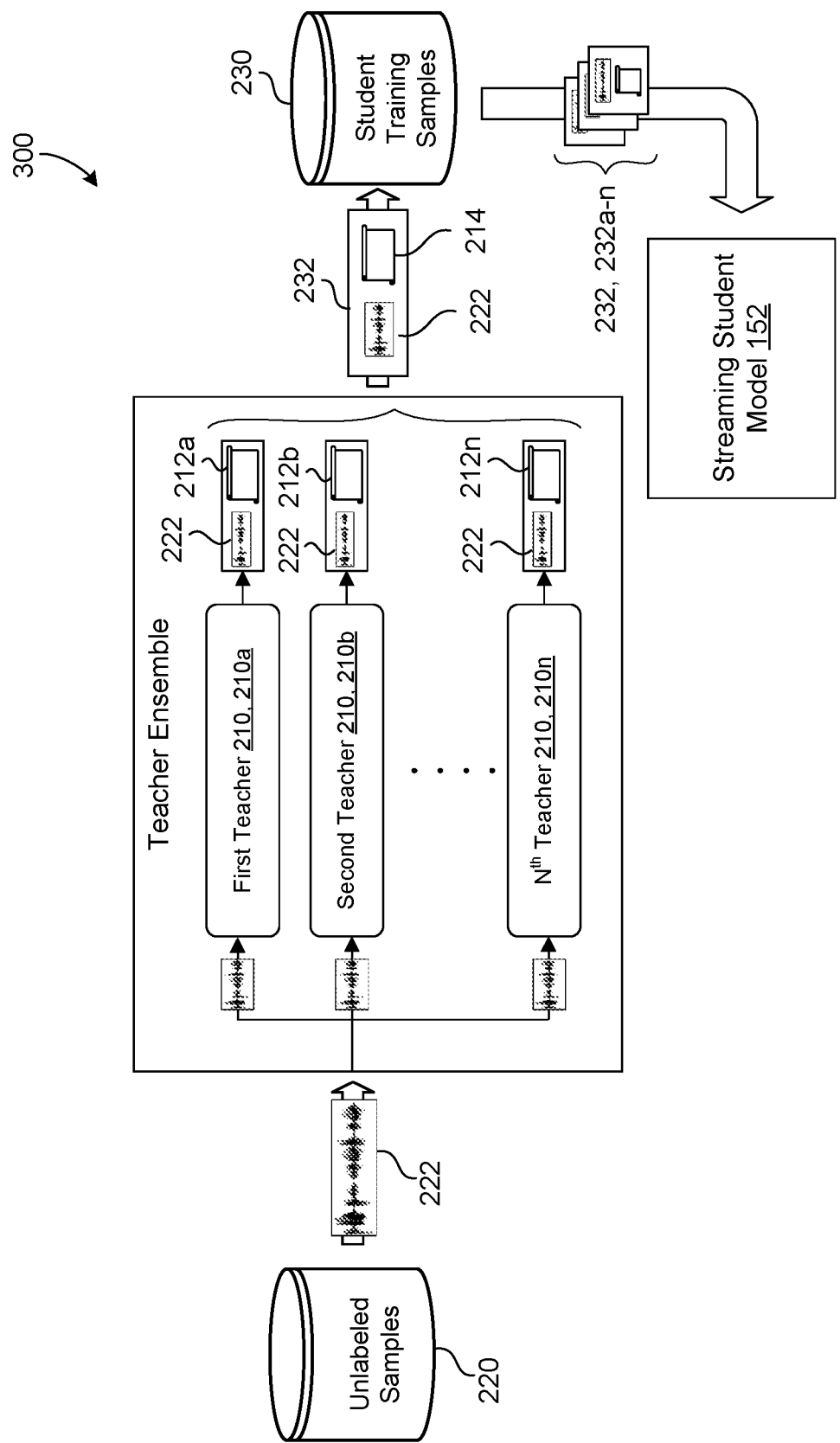
FIGS. 3A and 3B are schematic views of example training processes for training the streaming ASR student model using an ensemble of non-streaming ASR teacher models.
Figure 3B:
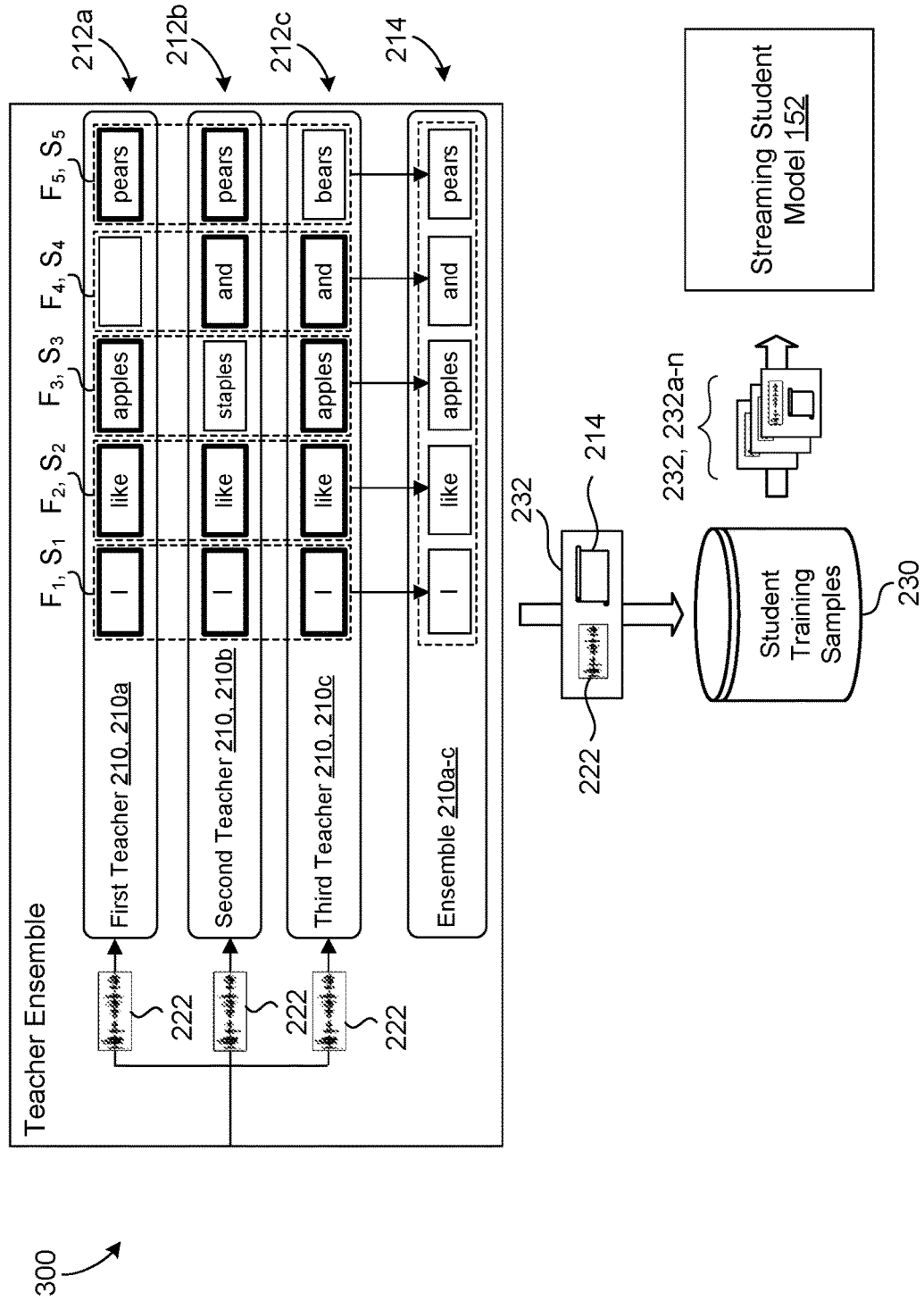

FIGS. 2A-2C depict a training process 200 for the streaming ASR model 152 while FIGS. 3A and 3B illustrate a variation of this training process 200 that uses an ensemble of teacher models 210 to train the streaming ASR model 152, which is referred to as an ensemble training process 300. Both the training process 200 and the ensemble training process 300 may be relatively similar except to the extent that more than one teacher model 210, 210a-n is used to generate a final transcription 214 in the ensemble training process 300. This means that, although not depicted, the ensemble training process 300 may also include additional components, such as the segmenter 240 and the augmenter 250, in its process flow.

Referring to FIGS. 2A-2C, the training process 200 is a distillation process where a non-streaming ASR model 210 (referred to as a no-streaming ASR teacher model 210 or simply a teacher model 210) distills its knowledge to the streaming ASR model 152 (also referred to as the streaming ASR student model 152 or simply the student model 152). Here, the teacher model 210 distills its knowledge to the student model 152 by training the student model 152 with a plurality of student training samples 232 that include, at least in part, labels or transcriptions 212 generated by the teacher model 210. In this sense, during the training process 200, the student model 152 learns to predict its own transcriptions 154 from the transcriptions 212 produced by the teacher model 210. Since the student model 150 is a streaming model that produces and updates speech recognition results that form the transcription 154 on a frame-by-frame basis, the training process 200 therefore leverages more accurate non-streaming model transcripts 212 to improve the accuracy of the student model 152 deployed for real-time speech recognition tasks.

In some implementations, during the training process 200, the teacher model 210 receives unlabeled training samples 222 from a corpus 220 of unlabeled training samples 222. The corpus 220 generally refers to any collection of unlabeled audio data (e.g., a database or a data store for audio data samples). An unlabeled training sample 222 refers to a sample of audio data that is without an accompanying label. That is, an unlabeled training sample 222 is unsupervised data without a corresponding transcript providing the label for the sample of audio data. When the teacher model 210 receives an unlabeled training sample 222, as input, the teacher model 210 is configured to generate, as output, a transcription 212 that predicts a label for the unlabeled training sample 222. This prediction function by the teacher model 210 therefore labels the unlabeled training sample 222 to form a student model training sample 232 that includes both the audio data of the unlabeled training sample 222 along with its corresponding transcription 212 generated by the teacher model 210. By using the teacher model 210, a plurality or corpus 220 of unlabeled training samples 222 are converted to a corpus 230 of student training model samples 232, 232*a-n*. The training process 200 then feeds the student training model samples 232 into the student model 152 to enable the student model 152 to learn to predict a transcription 154 based on the audio data of the previously unlabeled sample 222 along with its predicted transcription 212 generated by the teacher model 210. In this manner, the training process 200 distills a streaming ASR student model 152 using unlabeled training samples 222 and transcriptions 212 from the non-streaming ASR teacher model 210. Moreover, this training process 200 has the benefit that it uses unlabeled audio samples. This may be advantageous because it can often be difficult to obtain or to generate accurate labels for samples of audio data (e.g., especially for particular languages). For instance, some training processes have to manual label unlabeled audio data or to train a model with a smaller body of training samples due to a lack of labeled audio data (i.e., a lack of transcripts for the audio data).

Referring to FIG. 2B, the training process 200 may include a segmenter 240 that is configured to receive an unlabeled training sample 222 and generate an unlabeled segment 242 from the unlabeled training sample 222. The unlabeled segment 242 refers to some length or portion of the unlabeled training sample 222. For instance, unlabeled training samples 222 may be of various length (e.g., time duration) and the segmenter 240 may divide an unlabeled training sample 222 into a segments 242 of a lessor length or a finite length. For example, if the audio data of the unlabeled training sample 222 is two minutes long, the segmenter 240 may divide into smaller portions, such as 10 or 15 second segments 242. In this respect, the segmenter 240 may function to generate a greater number of unlabeled audio data samples (i.e., segments 242), to generate uniform length samples that will be fed to the teacher model 210 during the training process 200, and/or to prevent the teacher model 210 from receiving samples that are difficult for the teacher model 210 to handle (e.g., of a long duration that requires a significant amount of memory to generate a transcript 212 with the full context of the sample). In some examples, the segmenter 240 converts the unlabeled training sample 222 into segments 242 of random length. Here, the random length may be constrained to be, for example, less than a particular duration, but otherwise seek to represent how a speech recognition model, during implementation, may receive a speech input of varying lengths and need to be able to produce accurate recognition results for that speech input. With an unlabeled training sample 222 segmented by the segmenter 240, the teacher model 210 then receives unlabeled segments 242 of the unlabeled training sample 222 as input and predicts a transcript 212 for these unlabeled segments 242 similar to when the teacher model 210 receives unlabeled training samples 222 (e.g., as shown in FIG. 2A). As stated previously, although the segmenter 240 is not shown in the ensemble training process 300 of FIGS. 3A and 3B, a segmenter with similar functionality may also be used in the same manner during the ensemble training process 300.

Referring to FIG. 2C, the training process 200 may also include an augmenter 250 (e.g., in addition to the segmenter 240). An augmenter 250 functions to alter the audio data corresponding to the unlabeled training samples 222 after the teacher model 210 has generated a transcript 212 for the unlabeled training samples 222 to form a student training samples 232. Because the augmenter 250 is downstream from the teacher model 210 and the teacher model 210 has already produced a transcript 212 for the student training sample 232, the augmenter 250 augments or alters the audio data of the unlabeled training samples 222 in a manner that would not have an impact on the predicted transcript 212. This augmentation process by the augmenter forms an augmented audio sample 254 that will be used to train the student model 152. For instance, the augmenter 250 may be used to add noise or perform some other type of spectral augmentation. That is, the augmenter 250 may modify the waveform of the audio data to form the augmented audio sample 252 for the student training sample 232. In this respect, the student model 152 learns from a noisy student learning framework where the student training samples 232 include the augmented audio sample 252 along with its predicted transcription 212 from the teacher model 210. A noisy learning framework may allow the student model 152 to learn that slight differences in audio samples may result in the same transcript 212 and thus provide an additional degree of robustness for the training process 200. Much like the segmenter 240, although the augmenter 250 is not shown in the ensemble training process 300 of FIGS. 3A and 3B, an augmenter with similar functionality may also be used in the same manner during the ensemble training process 300.

Referring to FIGS. 3A and 3B, the ensemble training process 300 differs from the training process 200 in that the ensemble training process 300 trains the student model 152 using more than one teacher model 210. That is, the student model 152 is distilled from a plurality of teacher models 210, 210*a-n* by training the student model 152 using the unlabeled training utterances 222 paired with their corresponding transcriptions 212 generated by the teacher models 210. By using more than one teacher model 210, the student model 152 learns from (i) a more diverse source (i.e., multiple teacher models 210, 210*a-n*) and (ii) a final transcription 214 generated by the ensemble of teacher models 210 with improved transcription quality (e.g., when compared to a transcription from a single teacher model 210).

In some examples, each teacher model 210 of the teacher ensemble receives the same unlabeled training sample 222 (or unlabeled segment 242) and generates a transcription 212 for the received unlabeled training sample 222. For example, FIG. 3B depicts three teacher models 210, 210*a-c* where the first teacher model 210*a* generates a first transcript 212, 212*a* for the unlabeled training sample 222, the second teacher model 210*b* generates a second transcript 212, 212*b* for the unlabeled training sample 222, and the third teacher model 210*c* generates a third transcript 212, 212*c* for the unlabeled training sample 222. Because each teacher model 210 generates its own transcript 212 independently, the transcript 212 of one teacher model 210 may have differences when compared to the transcript 212 for another teacher model 210 even though the transcript 212 is intended to be a label for the same unlabeled training sample 222.

With each teacher model 210 generating its own transcript 212, these transcripts 212 are then merged or otherwise converted into a final transcript 214 to form the student training sample 232 where the final transcript 214 is the label for the unlabeled training sample 222. In this sense, the transcripts 212 from each teacher model 210 may be referred to as initial transcripts 212 while the final transcript 214 is the label that is applied to the unlabeled training sample 222 to form the student training sample 232. The techniques to merge these independently created transcripts 212 may vary, but generally the merging technique is a transcription error-reducing technique. For instance, during the ensemble training process 300, all of the transcripts 212 generated for an unlabeled training sample 222 (or unlabeled segment 242) may be compared to one another in order to determine the final transcript 214.

One approach to merge these transcripts 212 is to use a voting process. For example, the voting process may be a Recognizer Output Voting Error Reduction (ROVER) technique. In a voting process, the initial transcripts 212 generated by the teacher models 210 are aligned and divided into segments S where each segment corresponds to an alignment frame F. Here, a segment S of a transcript 212 may be a wordpiece, a word, a phrase, etc. With all of the transcripts 212 aligned, the most repeated segment S across all transcripts 212 in a particular frame F is voted as the segment S to be included in the final transcript 214. In this respect, each occurrence of a segment S in a frame receives a vote and the segment S with the greatest votes (i.e., a majority of votes) is included in the final transcript 214. The ensemble training process 300 then concatenates all of the most repeated segments S for each frame F to generate the final transcript 214.

FIG. 3B illustrates an example of an output voting technique. Here, each transcript 212 from the three teacher models 210a-c is divided into five segments S, $S_{1-5}$ where each segment S corresponds to one of five frames F, $F_{1-5}$. In this example, each segment S corresponds to a single word (also known as a word transition network (WTN)). For the first frame $F_1$, each of the three teacher models 210 have identical segments $S_1$ that include the word "I." Because "I" is the most repeated segment (e.g., receiving three votes) in the first frame $F_1$, the first frame $F_1$ of the final transcription 214 will include the word "I." For the second frame $F_2$, each of the three teacher models 210 have identical segments $S_2$ that include the word "like." Because "like" is the most repeated segment (e.g., receiving three votes) in the second frame $F_2$, the second frame $F_2$ of the final transcription 214 will include the word "like." For the third frame $F_3$, two of the three teacher models 210 have identical segments $S_3$ that include the word "apples" while one of the three teacher models 210 includes the word "staples." Because "apples" is the most repeated segment (e.g., receiving two of three votes) in the third frame $F_3$, the third frame $F_3$ of the final transcription 214 will include the word "apples." For the fourth frame $F_4$, two of the three teacher models 210 have identical segments $S_4$ that include the word "and" while one of the three teacher models 210 produced a blank. Because "and" is the most repeated segment (e.g., receiving two of three votes) in the fourth frame $F_4$, the fourth frame $F_4$ of the final transcription 214 will include the word "and." For the fifth frame $F_5$, two of the three teacher models 210 have identical segments $S_5$ that include the word "pears" while one of the three teacher models 210 includes the word "bears." Because "pears" is the most repeated segment (e.g., receiving two of three votes) in the fifth frame $F_5$, the fifth frame $F_5$ of the final transcription 214 will include the word "pears." Based on this process, each winning vote for a frame F is combined together to form the final transcription 214, "I like apples and pears." This process also shows that an initial transcript 212 for a particular teacher model 210 may have an error, but that error, when evaluated over all initial transcripts 212 is recognizable and able to be prevented from impacting (or less likely to impact) the final transcription 214. For instance, the second teacher model 210b thought the third frame $F_3$ should be "staples" when it is more likely that the word should be "apples" in the third frame $F_3$.

Non-streaming ASR models, such as the teacher model(s) 210, may use different types of neural network architectures. A non-streaming ASR model may use bi-directional encoding and/or an attention mechanism. Some examples of non-streaming ASR models include RNN-T models, conformer models, time-delay neural network (TDNN) models, Connectionist Temporal Classification (CTC) models. For example, a conformer transducer model utilizes a combination of a convolution neural network (CNN) and a transformer model's encoder architecture to capture local and global context (i.e., contextual information) for input audio data. In some implementations, the teacher model 210 is a conformer model with several conformer blocks (e.g., sixteen blocks) in the encoder and a single Long-Short Term Memory (LSTM) decoder layer (e.g., with 2048 cells) with a projection layer (e.g., of 640 outputs). Here, in this teacher model 210, the attention layer encodes all frames for an input audio sample simultaneously making it a non-streaming model. As an example of a TDNN model, the teacher model 210 may include an encoder with a stack of macro layers (e.g., three macro layers) and a decoder network with a single direction LSTM (e.g., with 1024 hidden units). Each macro layer may constructed from a 1-D convolution, a 1-D max pooling, and three bi-directional LSTM layers (e.g., with 512 hidden units in each direction with a 1536-dimensional projection). Here, the TDNN model architecture also includes a joint network (e.g., with 512 hidden units).

When the teacher model 210 has an RNN-T architecture, the exact architecture of the RNN-T may vary. For example, in one configuration of the RNN-T architecture, the encoder includes several macro layers (e.g., seventeen macro layers) where each macro layer has a plurality of attention heads (e.g., eight attention heads), 1-D convolutions (e.g., with a kernel size of fifteen), and a relative positional embedding (e.g., of 512 dimensions). In this configuration, the decoder network of the RNN-T may be a single direction LSTM with 1024 hidden units and a joint network with 512 hidden units. Here, the RNN-T architecture may have a final output that uses a 4 k (four thousand) word piece model. In another RNN-T configuration, the encoder includes two layers of 3×3 2D convolution layers with a 4× time reduction and a channel size of 640. It also includes several conformer blocks (e.g., sixteen blocks) with convolutions. These convolutions may have a kernel size of thirty-two and a positional embedding size of 128. In this RNN-T configuration, the decoder layer has a single LSTM (e.g., with 2048 cells and a projection layer of 640 outputs).

In some examples, the teacher model 210 has a CTC architecture. The CTC architecture for the teacher model 210 may include an additional language model to capture contextual information. In some implementations, a CTC version of the teacher model 210 has an encoder similar to an RNN-T such that the encoder includes two layers of 3×3 2D convolution layers with a 4× time reduction and a channel size of 640. The CTC encoder may also include several conformer blocks (e.g., sixteen blocks) with convolutions. These convolutions may have a kernel size of thirty-two and a positional embedding size of 128. For the CTC architecture, the decoder may differ from that of an RNN-T architecture in that the decoder is a simplified version with a single layer of 4096 hidden units with a projection layer of 640 units.

When using the ensemble training process 300, multiple teacher models 210 may all have the sample type of neural network architecture or different types of neural network architecture. That is, one teacher model 210 may have a different neural network architecture than a different teacher model 210. For example, to generate diverse initial transcriptions 212, the multiple teacher models 210 may have different neural network architectures. For instance, a first teacher model 210 may have a CTC architecture while a second teacher model 210 may have an RNN-T architecture. In some configurations, though the architecture of the neural network may differ between teacher models 210, the encoder of the neural network may stay the same or relatively the same. For instance, all teacher models 210 have a conformer-based encoder. A conformer-based encoder may be beneficial to a non-streaming ASR model, such as the teacher model 210, in that the conformer encoder is capable of accounting for both local and global context for a particular input of audio data.

Figure 4:
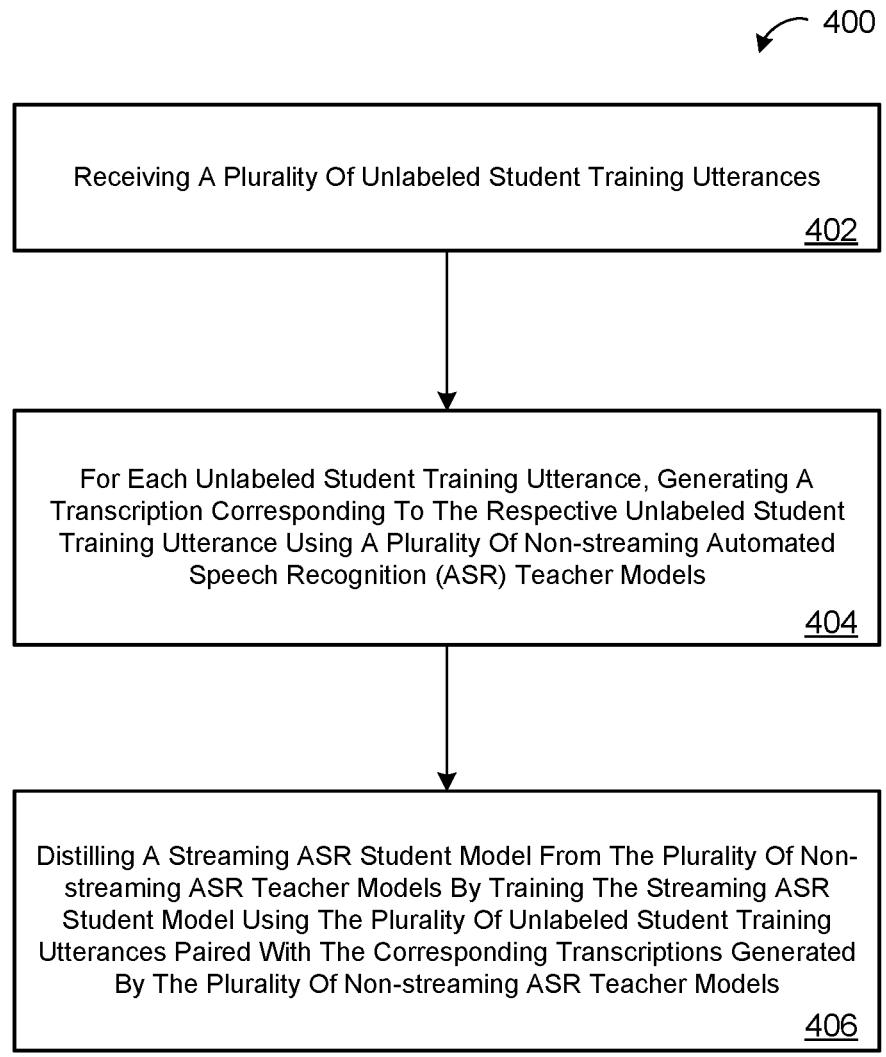
FIG. 4 is a flow chart of an example arrangement of operations for a method of training a streaming ASR student model.

FIG. 4 is a flowchart of an example arrangement of operations for a method 400 of training a streaming student model 152. At operation 402, the method 400 receives a plurality of unlabeled student training utterances 222. For each unlabeled student training utterance 222, at operation 404, the method 400 generates a transcription 212 corresponding to the respective unlabeled student training utterance 222 using a plurality of non-streaming ASR teacher models 210. At operation 406, the method 400 distills a streaming ASR student model 152 using the plurality of unlabeled student training utterances 222 paired with the corresponding transcriptions 212 generated by the plurality of non-streaming ASR teacher models 210.

Figure 5:
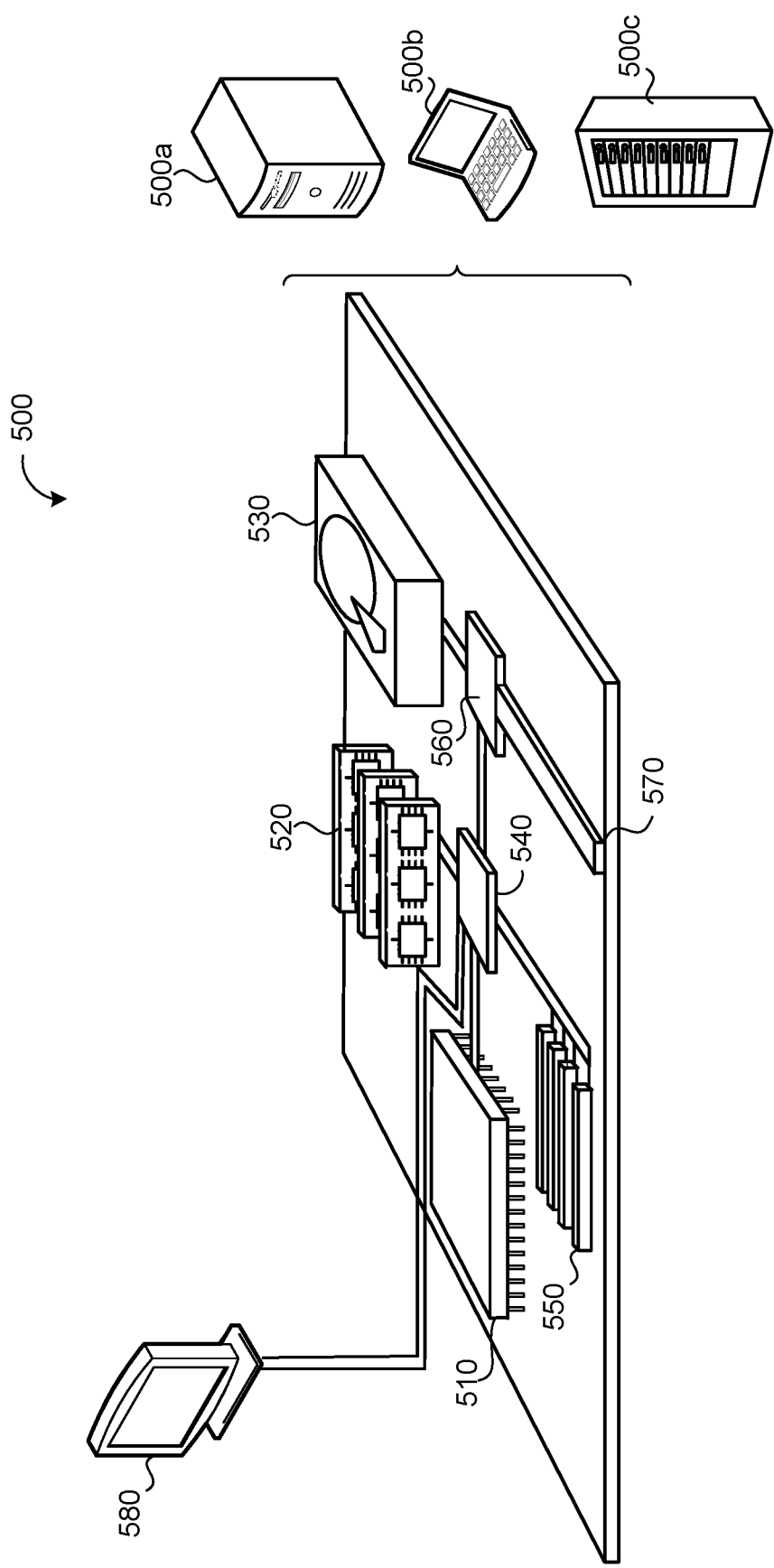
FIG. 5 is a schematic view of an example computing device that may be used to implement the systems and methods described herein.

FIG. 5 is a schematic view of an example computing device 500 that may be used to implement the systems (e.g., the speech recognition system 150) and methods (e.g., the training process 200, the ensemble training process 300, and/or the method 400) described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware 112, 144), memory 520 (e.g., memory hardware 114, 146), a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 570. The low-speed expansion port 570, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:

receiving a plurality of unlabeled student training utterances;

for each unlabeled student training utterance of the plurality of unlabeled student training utterances, generating a transcription corresponding to the unlabeled student training utterance using a plurality of non-streaming automated speech recognition (ASR) teacher models; and distilling a streaming ASR student model from the plurality of non-streaming ASR teacher models by training the streaming ASR student model using the plurality of unlabeled student training utterances paired with the corresponding transcriptions generated by the plurality of non-streaming ASR teacher models, wherein:

generating the transcription corresponding to the unlabeled student training utterance comprises:

receiving, as input at the plurality of non-streaming ASR teacher models, the unlabeled student training utterance;

at each non-streaming ASR teacher model, predicting an initial transcription for the unlabeled student training utterance; and generating the transcription for the respective unlabeled student training utterance to be output by the plurality of non-streaming ASR teacher models based on the initial transcriptions of each non-streaming ASR teacher model predicted for the respective unlabeled student training utterance;

generating the transcription for the respective unlabeled student training utterance to be output by the plurality of non-streaming ASR teacher models based on the initial transcriptions of each non-streaming ASR teacher model predicted for the respective unlabeled student training utterance comprises constructing the transcription using output voting; and constructing the transcription using output voting comprises:

aligning the initial transcriptions from each non-streaming ASR teacher model to define a sequence of frames;

dividing each initial transcription into transcription segments, each transcription segment corresponding to a respective frame;

for each respective frame, selecting a most repeated transcription segment across all initial transcriptions; and concatenating the most repeated transcription segment of each respective frame to form the transcription.

2. The method of claim 1, wherein the streaming ASR student model comprises a recurrent neural network transducer (RNN-T) architecture.

3. The method of claim 1, wherein the streaming ASR student model comprises a conformer-based encoder.

4. The method of claim 1, wherein each non-streaming ASR teacher model comprises a connectionist temporal classification (CTC) architecture.

5. The method of claim 4, wherein the CTC architecture comprises a language model configured to capture contextual information for a respective utterance.

6. The method of claim 1, wherein each non-streaming ASR teacher model comprises a conformer-based encoder.

7. The method of claim 1, wherein the plurality of non-streaming ASR teacher models comprise at least two different recurrent neural network architectures.

8. The method of claim 7, wherein a first non-streaming ASR teacher model comprises a recurrent neural network architecture and a second non-streaming ASR teacher model comprises a connectionist temporal classification (CTC) architecture.

9. A system comprising:
data processing hardware; and
memory hardware in communication with the data processing hardware, the memory hardware storing instructions that, when executed on the data processing hardware, cause the data processing hardware to perform operations comprising:
receiving a plurality of unlabeled student training utterances;
for each unlabeled student training utterance of the plurality of unlabeled student training utterances, generating a transcription corresponding to the unlabeled student training utterance using a plurality of non-streaming automated speech recognition (ASR) teacher models; and
distilling a streaming ASR student model from the plurality of non-streaming ASR teacher models by training the streaming ASR student model using the plurality of unlabeled student training utterances paired with the corresponding transcriptions generated by the plurality of non-streaming ASR teacher models,
wherein:
generating the transcription corresponding to the unlabeled student training utterance comprises:
receiving, as input at the plurality of non-streaming ASR teacher models, the unlabeled student training utterance;
at each non-streaming ASR teacher model, predicting an initial transcription for the unlabeled student training utterance; and
generating the transcription for the respective unlabeled student training utterance to be output by the plurality of non-streaming ASR teacher models based on the initial transcriptions of each non-streaming ASR teacher model predicted for the respective unlabeled student training utterance;
generating the transcription for the respective unlabeled student training utterance to be output by the plurality of non-streaming ASR teacher models based on the initial transcriptions of each non-streaming ASR teacher model predicted for the respective unlabeled student training utterance comprises constructing the transcription using output voting; and
constructing the transcription using output voting comprises:
aligning the initial transcriptions from each non-streaming ASR teacher model to define a sequence of frames;
dividing each initial transcription into transcription segments, each transcription segment corresponding to a respective frame;
for each respective frame, selecting a most repeated transcription segment across all initial transcriptions; and
concatenating the most repeated transcription segment of each respective frame to form the transcription.

10. The system of claim 9, wherein the streaming ASR student model comprises a recurrent neural network transducer (RNN-T) architecture.

11. The system of claim 9, wherein the streaming ASR student model comprises a conformer-based encoder.

12. The system of claim 9, wherein each non-streaming ASR teacher model comprises a connectionist temporal classification (CTC) architecture.

13. The system of claim 12, wherein the CTC architecture comprises a language model configured to capture contextual information for a respective utterance.

14. The system of claim 9, wherein each non-streaming ASR teacher model comprises a conformer-based encoder.

15. The system of claim 9, wherein the plurality of non-streaming ASR teacher models comprise at least two different recurrent neural network architectures.

16. The system of claim 15, wherein a first non-streaming ASR teacher model comprises a recurrent neural network architecture and a second non-streaming ASR teacher model comprises a connectionist temporal classification (CTC) architecture.

* * * * *